RICHARD C. BLAKE.
Improvement in Pressure Gauges.

No. 115,420. Patented May 30, 1871.

Attest.
E. T. Layman.
H. S. Lambdin.

Inventor.
Richard C. Blake
By H. Millward
Attorney

115,420

UNITED STATES PATENT OFFICE.

RICHARD C. BLAKE, OF CINCINNATI, OHIO.

IMPROVEMENT IN PRESSURE-GAGES.

Specification forming part of Letters Patent No. 115,420, dated May 30, 1871.

*To all whom it may concern:*

Be it known that I, RICHARD C. BLAKE, of Cincinnati, Hamilton county, State of Ohio, have invented certain new and useful Improvements in Pressure-Gages; and I do hereby declare the following to be a sufficiently full, clear, and exact description thereof to enable one skilled in the art to which my invention appertains to make and use it, reference being had to the accompanying drawing making part of this specification.

Nature and Objects of Invention.

My invention relates to the class of gages which employs an elastic metallic diaphragm to produce the motion of the dial-finger; and it consists, first, in a peculiar construction and combination of the gaskets and follower for making the steam-joint between the diaphragm and case, by which a perfect steam-joint is secured and a solid metallic bearing provided for the diaphragm to press against, thereby preventing variable indications at different times under the same pressure; second, in a peculiar device for adjusting the leverage between the diaphragm and toothed segmental arc, which operates the revolving dial-finger.

Description of the Accompanying Drawing.

Figure 1:
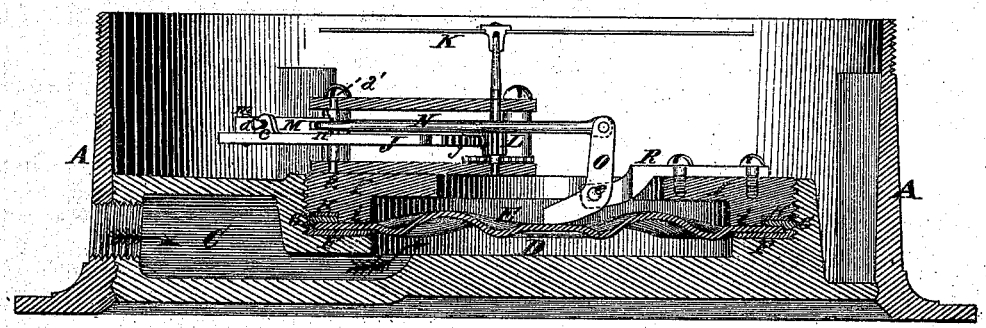
Figure 2:
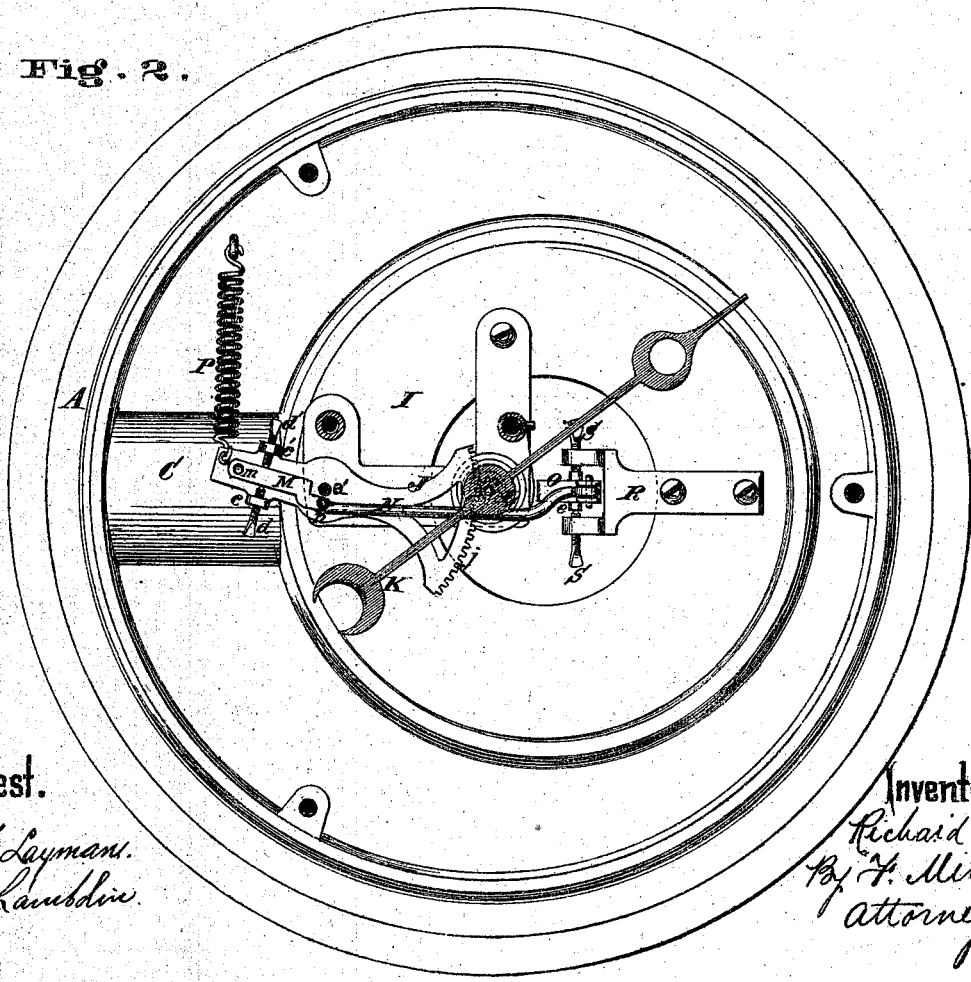

Figure 1 is a cross-section of a pressure-gage embodying my invention. Fig. 2 is a plan of the same.

General Description.

The case A of the gage is provided with the customary steam-supply port C, which terminates in the chamber D for the reception of the diaphragm E, which receives the steam-pressure. Rubber gaskets F G are fitted into the chamber above and below the outer flange of the diaphragm, and a metallic ring, H, is placed over the gasket G. The steam-joint is made by the compression of the gaskets by the follower I, which is screw-threaded on the outside to fit into the female screw provided in the chamber D. As the follower D necessarily revolves in making the joint, the intervention of the metallic ring H between the follower and upper gasket is necessary to prevent the follower from chafing the rubber. When the follower is forced down in the act of making the joints, the gaskets F G are forced together at the outer edges in such a way as to meet and also fill up the threads of the screw in the chamber D, opposite the gaskets, in the manner shown, and thus prevent any escape of steam past the edge of the gaskets or diaphragm in the event of its accidentally passing the faces of the gasket F. It has been found that where rubber alone is used to press against the upper face of the diaphragm E the gage will record variable indications at different times under the same degree of pressure, owing to the elastic and changeable nature of the rubber. To guard against this contingency I construct the follower I with a projecting annular collar, $i$, on the under side, which, when the gasket G is sufficiently compressed to make a joint, rests solidly upon the diaphragm E, and gives a hard metallic surface for the diaphragm to press against. J is the customary segmental arm which vibrates on the spindle-bearings $a\ a'$, and serves to connect the diaphragm with the revolving dial-finger K, by means of pinion L, teeth $j$ in the arc of the segment, pivoted bar M, connecting-rod or pitman N, and bell-crank or elbow-lever O, one leg of the latter resting upon the diaphragm in the manner shown, and continually pressed against the diaphragm to preserve the contact by the spiral spring P. The bar M is pivoted to the segment J at $m$, and connects with the rod N at the point $n$, and the movement of the gage is adjusted by changing the distance between the point $n$ and the center $a'$, on which the segment oscillates. To effect this adjustment in a cheap manner, and in a way that admits of accurate and delicate degree of adjustment, I provide the lugs $c\ c'$ on the segment, and fit into the same the screw-threaded adjusting-screws $d\ d'$, whose points rest against the sides of the bar M in the manner shown. It will be seen that this device admits of delicate adjustment and retains the adjustment permanently, not being liable to slip or loosen.

It has been a common practice to fit the bell-crank O snugly between the jaws of the bar R, and pivot the same on a stationary bolt or rivet, which passes through the jaws and bell-crank. This, if made a tight fit, is liable to stick in such a way that the spring P cannot return it to the face of the diaphragm. If fitted loose, it is shackling, and causes the gage to record incorrect indications. To provide a device not open to these objections, I insert a small spindle, *e*, tightly into the bell-crank O, or form the same on solid, the spindle being centered on the ends. The jaws of the bar R are fitted with jointed set-screws S, which engage in the centers of the spindle *e*. A fulcrum is thus provided, which, while being free to oscillate at all times, is not liable to stick, and preserves the bell-crank in one position laterally.

Claims.

I claim—

1. In the described connection with the diaphragm E, the gaskets F G, metallic ring H, and screw-threaded follower I, the latter being provided with projecting ring or collar *i*, the whole being combined and operating substantially in the manner and for the purpose set forth.

2. In combination with the segment J *j* and pivoted bar M, connected as shown, the lugs *c c'* and set-screws *d d'*, for the purpose specified.

In testimony of which invention I hereunto set my hand.

RICHARD C. BLAKE.

Witnesses:
 FRANK MILLWARD,
 J. L. WARTMANN.